No. 730,016. PATENTED JUNE 2, 1903.
K. HEIN.
CROSS WIRE FOR OPTICAL MEASURING INSTRUMENTS.
APPLICATION FILED MAR. 17, 1902.
NO MODEL.
4 SHEETS—SHEET 1.

WITNESSES:
F. W. Wright
S. C. Crundl

INVENTOR
KARL HEIN
BY
Howson and Howson
HIS ATTORNEYS.

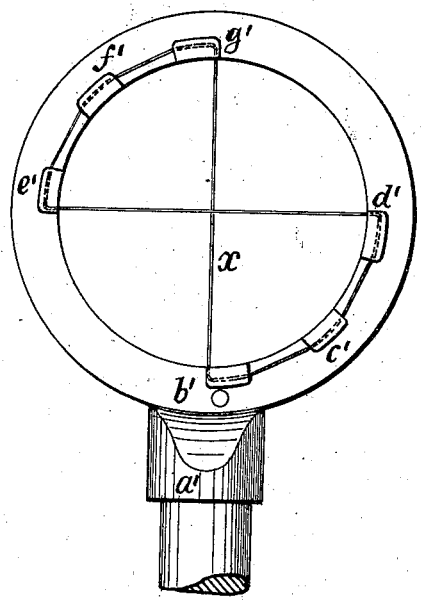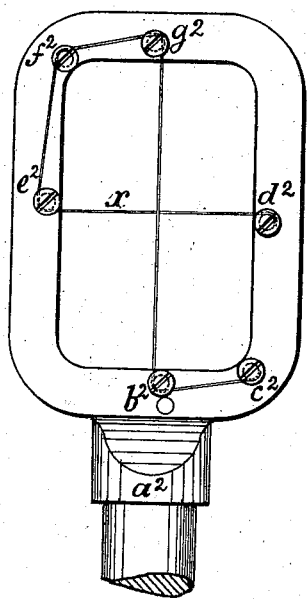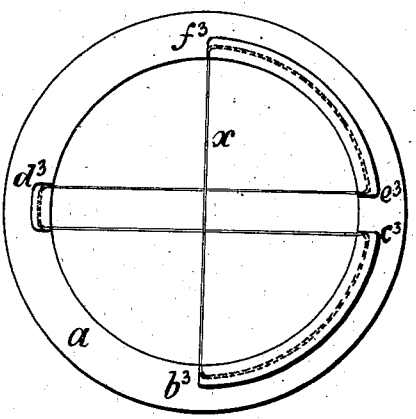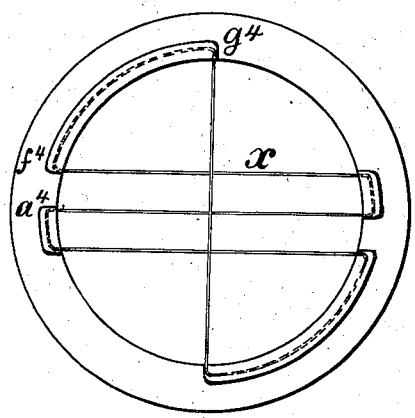

No. 730,016. PATENTED JUNE 2, 1903.
K. HEIN.
CROSS WIRE FOR OPTICAL MEASURING INSTRUMENTS.
APPLICATION FILED MAR. 17, 1902.
NO MODEL. 4 SHEETS—SHEET 3.
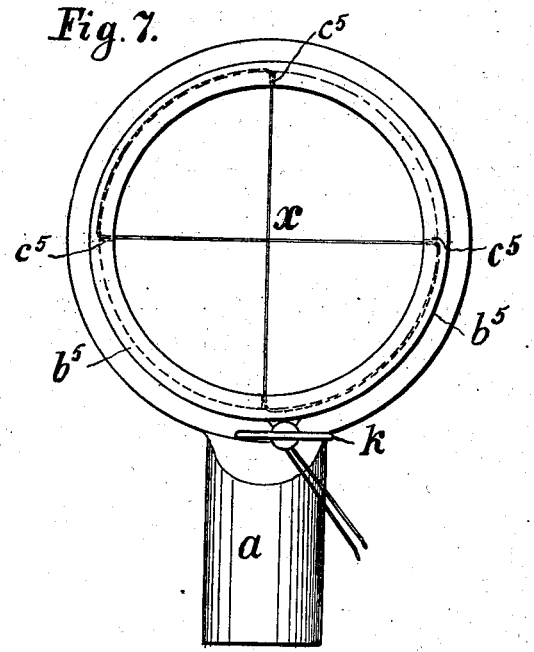
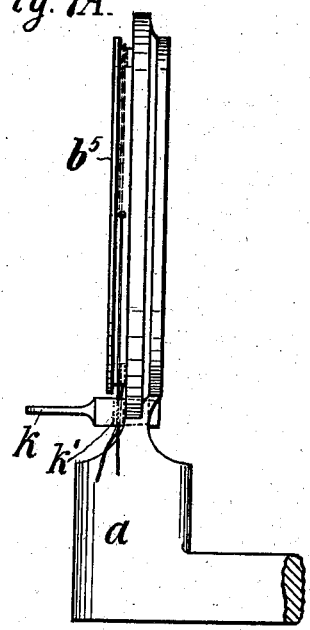
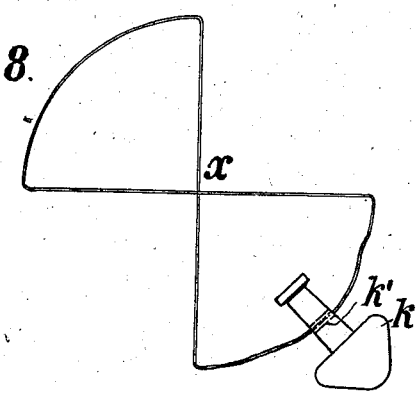
WITNESSES
F. W. Wright
S. C. Connor
INVENTOR
KARL HEIN
By
Howson and Howson
HIS ATTORNEYS No. 730,016. Patented June 2, 1903.

UNITED STATES PATENT OFFICE.

KARL HEIN, OF HANOVER, GERMANY.

CROSS-WIRE FOR OPTICAL MEASURING INSTRUMENTS.

SPECIFICATION forming part of Letters Patent No. 730,016, dated June 2, 1903.

Application filed March 17, 1902. Serial No. 98,643. (No model.)

*To all whom it may concern:*

Be it known that I, KARL HEIN, a subject of the King of Prussia, Emperor of Germany, and a resident of Hanover, in the German Empire, have invented an Improved Cross-Wire for Optical Measuring Instruments, of which the following is a specification.

The object of my invention is to simplify and improve the construction of the "cross-wire," "cross-hair," or "fiber-cross" devices, as they are variously termed, of optical measuring instruments and the like.

In this specification I will for convenience refer to the device under the term "cross-wire."

Figure 1:
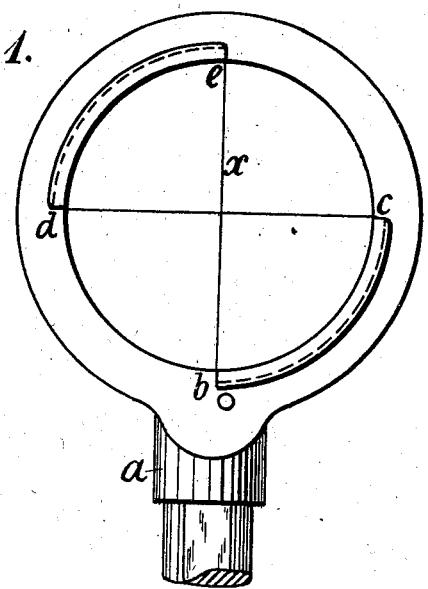
Figure 1A:
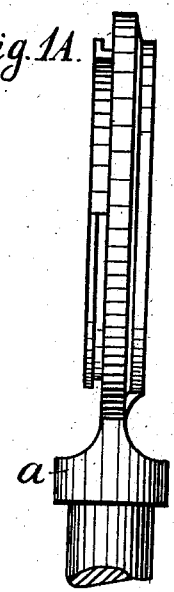
Figure 2:
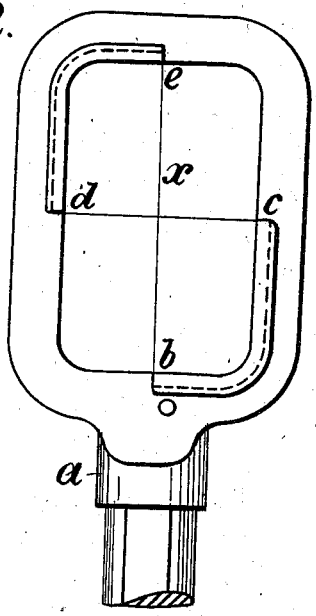
Figure 2A:
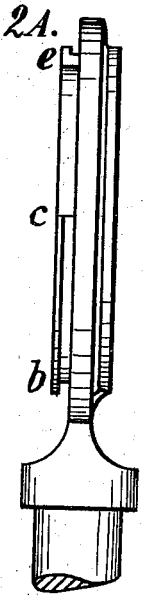

In the accompanying drawings, Figures 1 and 1$^A$ are face and edge views, respectively, of one form in which my invention may be carried into effect. Figs. 2 and 2$^A$ are similar views of a modification. Figs. 3 to 10$^A$, inclusive, are views of other modifications.

One of the principal features of my invention consists in providing the cross-wire carrier with guides whereby a single thread may be wound in such a manner that it crosses itself within the carrier.

I use the term "thread" in this specification in a general sense and as including any suitable material, such as fiber, wire, or hair.

In Figs. 1 and 2 I have represented the cross-wire frame or carrier $a$ as a circular ring, on one face of which I provide two thread-guides $b\,c$ and $d\,c$ opposite each other, Fig. 1, and with the ends of these guides diametrically opposite each other and in two planes perpendicular to each other, so that upon winding a single thread $x$ around these diametrically opposite guides the lines of the thread will cross each other in the center of the ring space, so as to form the desired cross-wire out of a single thread, as illustrated in Fig. 1.

The modification illustrated in Figs. 2 and 2$^A$ is identical with that illustrated in Figs. 1 and 1$^A$, except that the ring frame or carrier is shown as of rectangular form instead of the circular shape shown in Fig. 1.

In the modification Fig. 3 one guide of the ring-carrier $a'$ is formed of three lugs or blocks $b'\,c'\,d'$, while the other diametrically opposite guide is formed of three similar lugs or blocks $e'\,f'\,g'$.

In the modification illustrated in Fig. 4 a ring-carrier is shown as of rectangular outline and one guide is formed of three pins $b^2\,c^2\,d^2$ and the other guide is formed of three like pins $e^2\,f^2\,g^2$. In these two cases the single thread $x$ is carried around the guides, as in Figs. 1 and 2, so as to form two lines crossing each other in the center of the ring-space.

In Fig. 5 the carrier A is shown as provided with three guides, two of them $b^3\,c^3$ and $e^3\,f^3$ being on one side of the ring, while the third guide $d^3$ is a short piece on the opposite side of the ring, so that the single thread is carried once perpendicularly and twice horizontally across the ring-space.

I have illustrated a similar construction in Fig. 6, except that there the guides $b^4\,c^4$, $d^4\,e^4$, and $f^4\,g^4$ are distributed so as to permit of the single wire $x$ being carried once perpendicularly and three times horizontally across the ring-space.

The guides for the threads need not consist of separate or interrupted parts as so far described. Such guides may be formed, as illustrated in Fig. 7, by providing the ring with a complete or uninterrupted guide-rim $b^5$, in which at the proper places—say diametrically opposite each other—there are formed holes $c^5$, through which the thread may be passed so as to cross itself within the ring-space in the manner hereinbefore described. The cross-wire carrier thus constructed may be used for several threads instead of a single thread.

In connection with the described feature of my invention I may provide means for applying tension to the thread, so that it may be kept taut at all times. Thus in Figs. 7 and 7$^A$ I have shown a peg $k$, somewhat like the tightening-peg of a stringed musical instrument, the peg being frictionally set into an opening in the carrier $a$ and having a transverse opening $k'$, through which the ends of the thread $x$ may be passed, as illustrated in Figs. 7 and 7$^A$, so that by adjusting the peg rotarily the thread may be made and kept taut.

In the diagram Fig. 8 I have illustrated the thread $x$ as simply passing through the opening $k'$ in the peg $k$.

Figure 9:
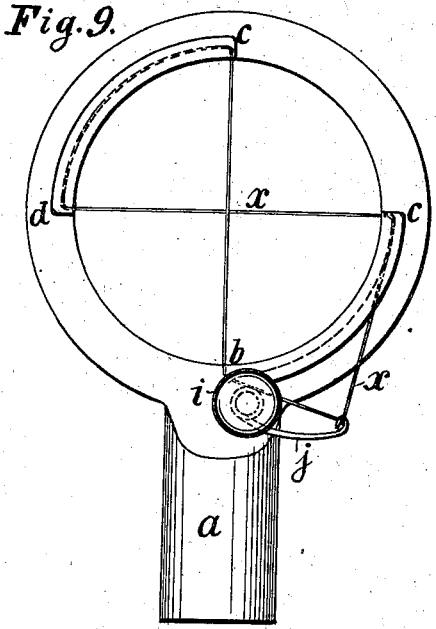
Figure 9A:
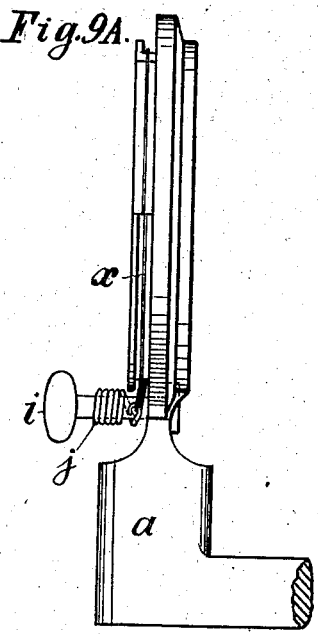

In Figs. 9, 9$^A$ I have illustrated the peg $i$ as carrying a coiled spring $j$ with a hooked end engaging the loop of thread x, so as to keep the thread under constant tension.

Figure 10:
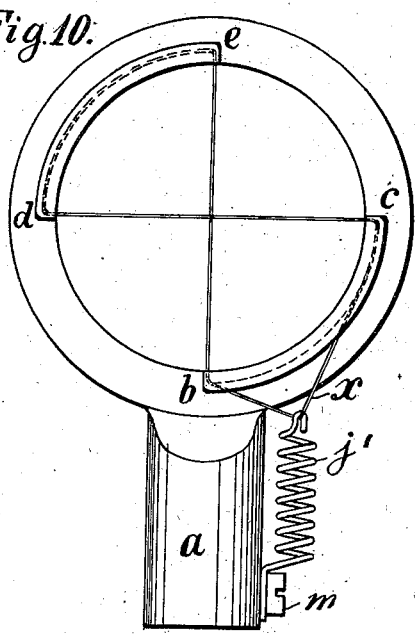
Figure 10A:
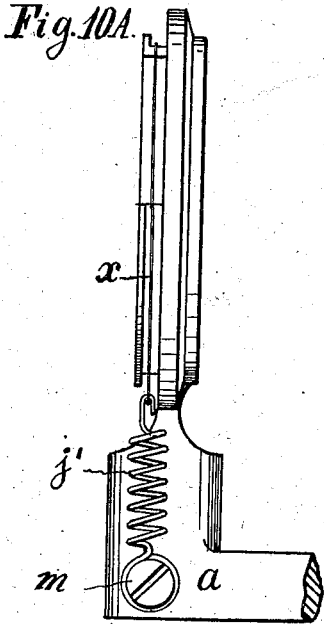

In the modification, Figs. 10 and 10ᴬ, a helical spring j', secured at its lower end by a screw m to the carrier a and connected at its upper end to the loop of thread x, will keep the latter taut.

I claim as my invention—

1. A cross-wire device for optical measuring instruments, consisting of a ring having guides and a single thread wound over the guides and crossing itself within the ring-space.

2. A cross-wire device for optical measuring instruments, consisting of a ring having two diametrically opposite guides with the two ends of each guide standing in planes perpendicular to each other, whereby on winding a single thread over the guides, it will cross itself in the center of the ring, substantially as described.

3. A cross-wire device for optical measuring instruments, consisting of a ring having thread-guides, a single thread wound over the guides and crossing itself within the ring-space, and means for applying tension to the thread, substantially as described.

In testimony whereof I have signed my name to this specification in the presence of two subscribing witnesses.

KARL HEIN.

Witnesses:
  LUIZE KNOKE,
  EMMA G. WHITE.